United States Patent [19]

Rodger

[11] 4,000,747
[45] Jan. 4, 1977

[54] FEED MECHANISM FOR PEANUT COMBINE

[75] Inventor: Alexander J. Rodger, Potgietersrus, South Africa

[73] Assignee: Slattery Manufacturing (Proprietary) Ltd., Potgietersrus, South Africa

[22] Filed: Mar. 12, 1975

[21] Appl. No.: 557,729

[30] Foreign Application Priority Data

Mar. 18, 1974  South Africa .................... 74/1747

[52] U.S. Cl. ......................................... 130/30 C
[51] Int. Cl.² ..................................... A01D 29/00
[58] Field of Search ............ 130/30 R, 30 B, 30 C, 130/30 E, 30 F, 30 G, 30 H, 30 J, 30 P, 33

[56] References Cited

UNITED STATES PATENTS

| 369,071 | 8/1887 | Nicholson | 130/30 C |
| 1,380,449 | 6/1921 | Whitmore | 130/30 C |
| 1,866,605 | 7/1932 | Stewart | 130/33 X |
| 2,454,156 | 11/1948 | Good | 130/30 C |
| 2,703,953 | 3/1955 | Altemus | 130/30 C X |

Primary Examiner—Russell R. Kinsey
Attorney, Agent, or Firm—Robert L. Farris

[57] ABSTRACT

A peanut picking machine has a side mounted fork to lift dried peanut heaps and dump them into a hopper. A conveyor feeds crop from the hopper to peanut picking apparatus through a feed opening. An adjustable shutter controls the rate of feed through the opening both by virtue of its position and its attitude with respect to the conveyor.

3 Claims, 7 Drawing Figures

FEED MECHANISM FOR PEANUT COMBINE

This invention relates to peanut picking machines, that is, to machines in which a peanut crop is subjected to the action of peanut picking apparatus which causes the peanuts in their shells to be picked from the vines on which they grew, so that the peanuts can later be separated from the vines.

It has been found over the years, that the best way to produce high quality peanuts, referred-to as "table nuts," suitable for human consumption either roasted or otherwise (as opposed to those peanuts which are fit only for processing to produce vegetable oil) is to employ the so-called "dry heap" system of harvesting.

In the dry heap system, the peanut crop is separated from soil and formed into heaps which are left to dry for the necessary length of time under the natural conditions of wind and sunshine. The heaps are so constructed that most of the peanuts themselves are inside the heaps and so that any rain that falls on the heaps runs off.

However, use of the dried heap system of harvesting as opposed to the wet windrow system results in problems in mechanizing the operation of picking the peanuts from the vines when the heaps have dried sufficiently. This is due to the spacing of the heaps from each other and the consequential intermittent nature of the feed of crop to picking apparatus in a peanut picking machine.

It is a peculiar requirement of peanut picking apparatus that for efficient operation it needs to be provided with a feed of peanut crop to be picked, at substantially constant rate. If fed with crop at too high a rate, the apparatus becomes plugged or jammed. If fed with crop at too low a rate, the picking efficiency suffers.

In the past, manual labour has been employed to solve this problem by providing a more-or-less constant feed of crop from dried heaps thereof onto a conveyor leading to a picking drum in a peanut picking machine drawn through the field from heap to heap.

It is an object of the present invention to provide means whereby the harvesting of peanuts by the dried heap system may be more fully mechanized than hitherto.

According to the invention there is provided a peanut picking machine comprising; a hopper to receive peanut crop to be picked, a conveyor operative to convey peanut crop out of the hopper, and peanut picking means positioned to receive peanut crop from the conveyor, characterized by structure defining a feed opening through which crop is conveyed by the conveyor out of the hopper, said structure comprising a shutter mounted so as to be movable towards and away from the conveyor to adjust the size of the feed opening.

The provision of a shutter whereby the size of the feed opening may be adjusted allows the rate at which the conveyor removes crop from the crop heap in the hopper to be controlled - so that the peanut picking means can be fed at the optimum rate.

A further feature of the invention is that the attitude of the shutter with respect to the adjacent portion of the conveyor can be adjusted. This allows the aggressivity with which the conveyor attacks the heap of peanut crop in the hopper to be changed.

Other important features of the invention are a crop lifting arm and an associated pivotable crop supporting member at the forward end of the arm - whereby peanut crop is loaded into the hopper. A sequencing mechanism is provided for controlling the operation of the arm and the crop supporting member by means of hydraulic rams, both during raising and lowering of the arm.

An embodiment of the invention will now be described by way of example with reference to the accompanying drawings in which.

As shown in the drawings, a peanut picking machine in the form of a peanut combine 10 comprises a main body 12 mounted on wheels 14 and having a draught beam 16 at its forward end whereby the combine is drawn by a tractor. The forward end of beam 16 has a transverse mounting member 18 connected thereto so as to be pivotable relative to the beam about a central vertical axis and about a central horizontal axis extending in the fore/aft direction. Member 18 carries pins 20 adapted to be connected to the draught links of a tractor so that the combine is drawn by the tractor in semi-mounted fashion.

Power for driving crop treatment apparatus in the combine is derived from the p.t.o. shaft of the tractor through the usual primary power input shaft 21 having universal joints 22 at each end. Shaft 20 is connected to a secondary shaft 24 supported by bearings 26 on a bracket 28 depending from beam 16.

Figure 2:
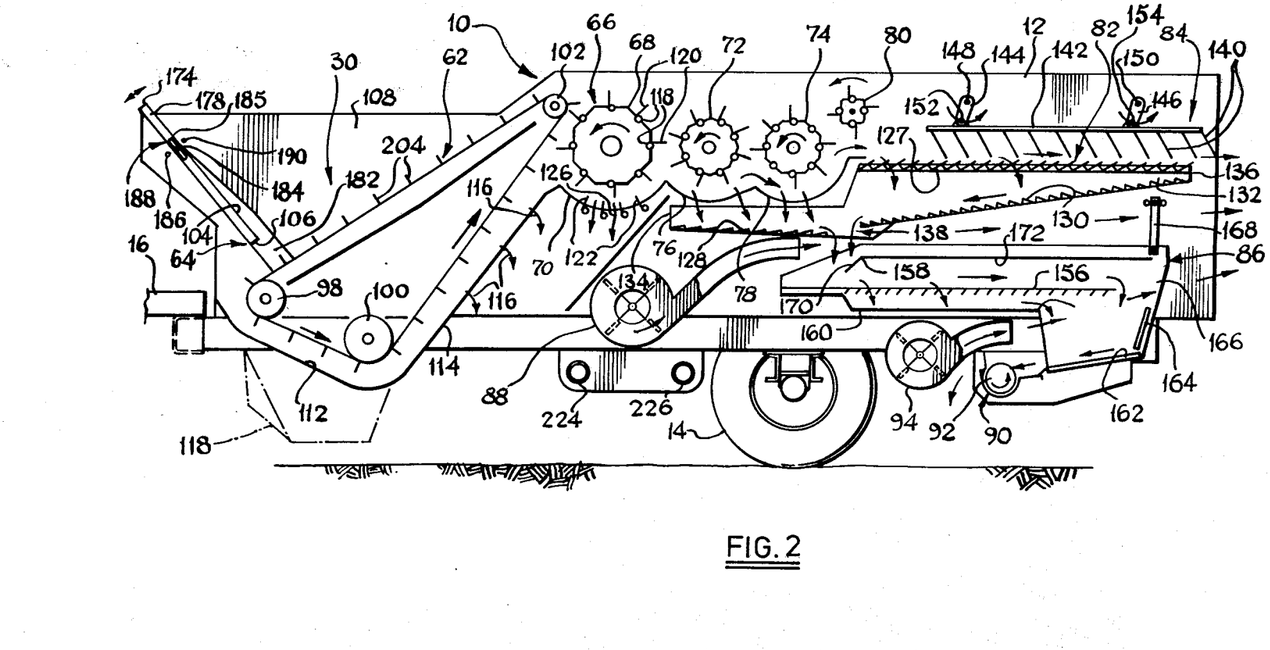
FIG. 2 shows the peanut combine of FIG. 1 sectioned longitudinally to show its peanut picking and separating apparatus and with certain parts such as a bulk tank and a hay bin removed for illustration purposes.

Peanut combine 10 further comprises the following main components:

a hopper 30 to receive peanut crop to be picked;
heap lifting apparatus 32 to lift dried peanut heaps from the ground and deposit them in the hopper 30;
peanut picking or stripping means within main body 12 and shown in FIG. 2, to remove peanut pods from the vines or hay;
peanut separating means within main body 12 and shown in FIG. 2, to separate peanut pods from the vines or hay;
a hay bin 34 to receive the peanut hay, the bin being openable to dump the hay periodically in heaps;
a duct 36 through which separated peanut pods are blown (i.e. transported by air);
a cyclone peanut decellerating device 38 to receive peanuts from duct 36, and comprising a square section volute duct 40 leading to a funnel 42;
a rotary screen 44 positioned to receive peanuts from device 38 and comprising a drum made up of mutually parallel wires extending parallel to the axis of the drum (said axis extending forwards and slightly downwards), the wires being spaced circumferentially from each other by a distance sufficient to permit the escape of peanut sticks but not sufficient for the passage of peanut pods;

four bagging chutes 46, 48, 50 and 52 which deliver respectively peanut sticks and sand, shelled split nuts and sticks, small peanuts and a few sticks and peanuts only. These materials are obtained from successive portions of screen 44;

a bagging platform 54;

a duct 56 through which peanuts from rotary screen 44 are blown (i.e. conveyed by air) when bagging chutes 46 to 52 are not in use; and a bulk tank 58 to receive peanuts from duct 56. Several of the walls of the tank are of expanded metal to allow air from duct 56 to freely escape. A pair of rams 60, one on each side of the tank are provided to tilt the tank towards the right hand side of the combine to unload the peanuts into a truck (not shown) alongside.

Referring now to FIG. 2, it will be seen that the main features of the internal crop handling apparatus of peanut combine 12 are as follows:

an endless conveyor 62 operative to convey peanut crop out of the hopper 30;

Structure defining a feed opening 64 through which crop is conveyed by the conveyor;

peanut picking means 66 in the form of a peanut picking drum 68 and an associated concave 70 positioned to receive peanut crop from conveyor 62;

first and second rotary peanut separating drums 72, 74 and respective associated open grate concaves 76, 78 positioned to receive picked crop from drum 68;

a rotary stripper drum 80 positioned to remove crop from second separating drum 74;

a first shaker unit 82 positioned to receive crop from separator drum 74;

crop agitating means in the form of haykickers 84 positioned to agitate crop passing over the first shaker unit;

a second shaker unit 86 positioned to receive crop from the first shaker unit;

a first blower 88 positioned to pass a stream of air through crop falling between the first and second shaker units;

a trough 90 and an auger 92 therein positioned to receive peanuts from second shaker unit 86 and operative to convey them laterally to the left hand side of the combine to duct 36 to be conveyed by air to cyclone device 38 as described above; and a second blower 94 positioned to pass a stream of air through the lower part of second shaker unit 86 to act on the crop as it passes through said unit.

The main internal crop handling features referred to above will now be described in turn in a little more detail.

Conveyor 62 comprises transversely spaced roller chains 96 which carry transversely crop carrying members (to be described later) and which are trained round three pairs of sprockets 98, 100, 102.

The run of conveyor 62 between sprockets 102 and 98 slopes forwards and downwards and constitutes a bottom or floor of hopper 30 (i.e. a wall which carries at least some of the weight of the crop. The hopper is generally V-shaped as seen in side elevation, and the front wall is constituted by a pressed steel shutter 104 the lower edge 106 of which defines the upper edge of feed opening 64. The hopper has a generally V-shaped side wall 108 at the right hand side of the combine. Only a very low side wall 110 is provided at the left hand side of the hopper (see FIG. 1) in order to provide easy access for crop from crop lifting apparatus 32.

The two runs of conveyor 62 between sprockets 98 and 100, and between sprockets 100 and 102 act as undershot conveyors and for this purpose crop support plates 112 and 114 respectively are provided below these runs. Support plate 114 is formed with multiple apertures (not shown) i.e. as a screen, to allow the escape of sand and soil which falls to the ground as indicated by the arrows 116. The use of screens with conveyors on harvesters is well-known in the art.

It will be noted that a mounting 117 for a conventional crop pick-up is indicated in dotted lines below crop support plate 112. This is simply to indicate the pick-up mounting position on the peanut combine to convert the machine to pick-up windrowed peanut crop instead of dried peanut heaps. When a pick-up is attached to the machine, the crop support plate 112 is removed.

Peanut picking drum 68 carries eight detachable tubes 118 each supporting a series of outwardly projecting spring fingers 120. The drum fingers 120 pass between and co-operate with a series of stripping fingers 122 mounted on concave 70. The concave fingers 122 are adjustable in attitude by means of a series of exterior handles 124 (see FIG. 1) similar to the adjustment shown in U.S. Pat. No. 2,454,156 so as to adjust the aggressvity of the picking action. Such adjustment is needed to accommodate changes in crop characteristics and in particular changes in crop dryness.

Concave 70 is formed with a series of slots (not shown) of such a size to permit the escape of sand but to prevent appreciable loss of peanuts. Arrow 126 indicates sand and soil falling back to the ground.

The first and second peanut separating drums 72, 74 are both similar in structure to picking drum 68 but slightly smaller in effective diameter. Their respective concaves 76, 78 have no picking fingers and are formed with 1½ inch diameter apertures (not shown) to allow the passage of peanut pods through them.

Stripper drum 80 is otherwise similar to separating drums 72, 74 but is smaller, has only four sets of fingers or tines and rotates faster. In use it strips crop off the second separating drum.

First shaker unit 82 comprises a screen 127 formed with rearwardly and upwardly opening louvres, and first and second walker boards 128, 130. These three parts are formed into a single box-like unit by side walls 132 and end walls 134, 136. The shake unit is suspended for oscillation by pivoted hanger arms (not shown) at each side and is oscillated in a known manner by a crank mechanism on the outer side of main body 12. Walker boards 128, 130 are formed with steps whereby, upon oscillation they convey crop material forwards and rearwards respectively, towards an opening 138 between their adjacent ends.

Hay kickers 84 comprise rods 140 projecting downwards at various angles from each of four transversely spaced support bars 142. The bars 142 are themselves mounted on crank arms 144, 146 which, in use, rotate about respective axes 148, 150 and are connected to the bars by pivots 152, 154. The bars 144 and 146 are rotatably mounted on the main body 12. Conventional drive means (not shown) connect the crank arms 144 and 146 to the power input shaft 21.

Second shaker unit 86 comprises a main screen 156 having forwardly and downwardly opening Louvres, a sheet metal dividing board 158 mounted above the main screen, a sheet metal pan 160 and a sloping screen 162, with small apertures (not shown) for the passage of dirt, below the main screen 156, and a baffle board 164. These parts are formed into a single box-like unit by side walls 166. The shaker unit is suspended for oscillation by a pair of pivoted hanger arms 168 at each side and oscillated by a crank mechanism (not shown) in timed relationship with the first shaker unit but 180 degrees out of phase therewith so as to effect balancing thereof. A similar oscillating crank mechanism is shown in U.S. Pat. No. 2,454,156.

Blowers 88 and 94 are similar to the fanning mills of grain combines and have radial paddles mounted on transverse shafts (not shown), air intakes at each side of the combine and adjustable baffles may be provided on said intakes to vary the rate of air flow.

Figure 3:
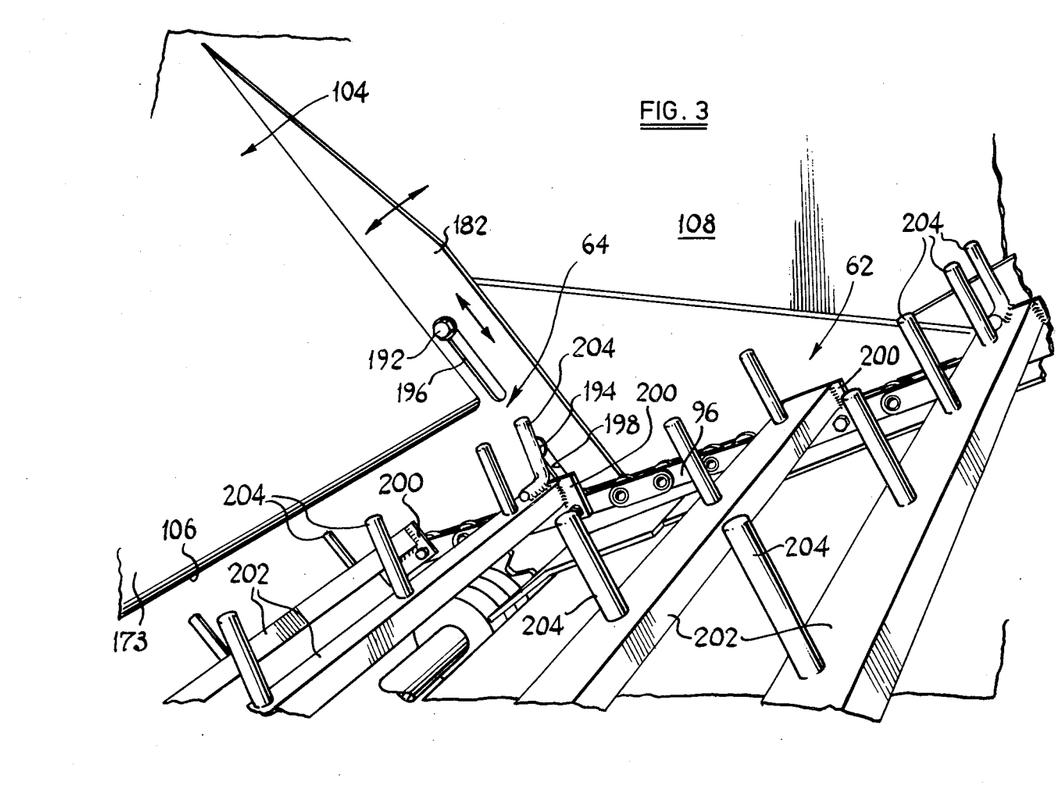
FIG. 3 shows a perspective view in the direction indicated by arrow III in FIG. 1 of a portion of a hopper, a conveyor, a feed opening and a shutter for said opening.
Figure 4:
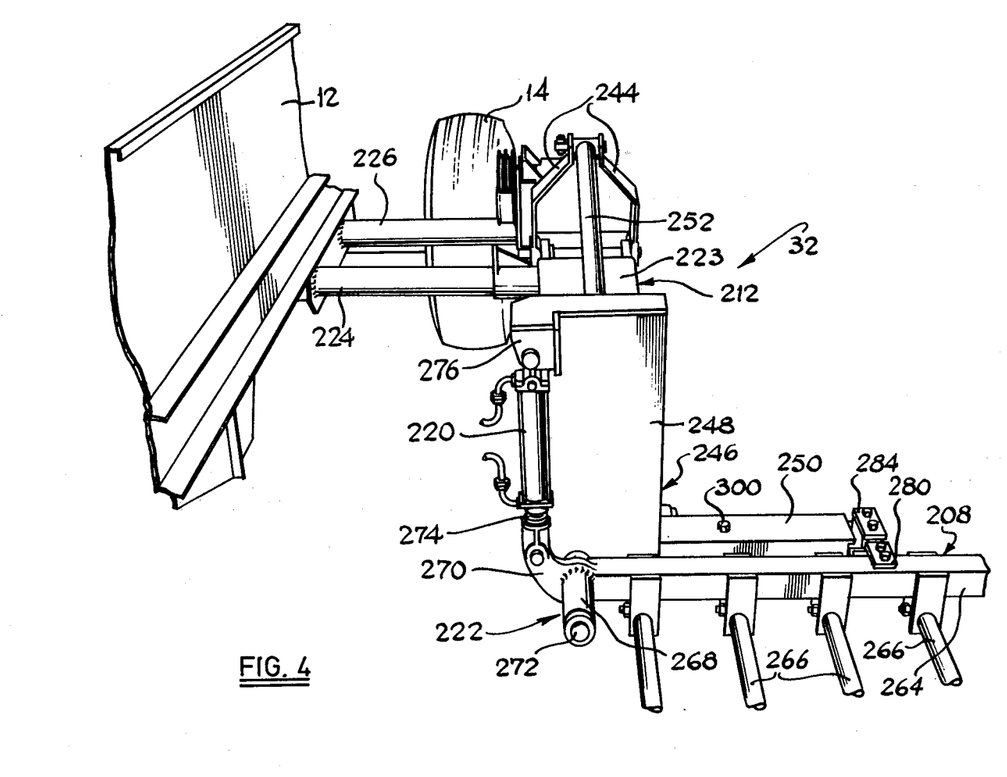
FIG. 4 shows a perspective view of a portion of the peanut combine of FIG. 1 as seen in the direction indicated by arrow IV in FIG. 1, showing apparatus for lifting dried peanut heaps and depositing them in a hopper of the combine.
Figure 5:
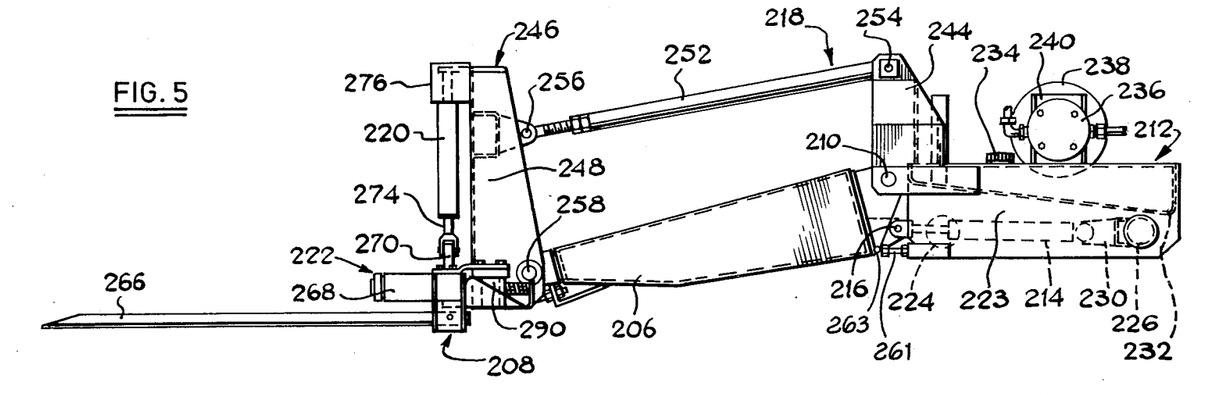
FIG. 5 shows the heap lifting apparatus as seen in side elevation.

As shown in FIGS. 2 and 3, shutter 104 is in the form of a rectangular pressed sheet steel structure having a flat crop supporting surface 173 and a rigidifying flange along each edge thereof i.e. bottom edge 106, top edge 174, and side edges 176 (see FIG. 1) and 178. A pair of mounting plates 180, 182 are welded to the shutter and form extensions of side edges 176 and 178 respectively, at the lower end of the shutter.

The shutter 104 is mounted so that its attitude with respect to the adjacent portion of conveyor 62 can be adjusted so as to adjust the aggressivity of the crop feed through feed opening 64 and so that the shutter can move towards and away from the conveyor to adjust the size of the feed opening.

The shutter 104 is supported at its upper end and at its right hand side only by a bolt 184 and associated nuts. The bolt extends through a slot 185 in edge 176 of the shutter and through one of three apertures 186, 188, 190 in side wall 108 of the hopper 30. Slot 185 allows adjustment of the shutter towards and away from the conveyor, the three holes 186, 188, 190 allow adjustment of the attitude of the shutter. In this embodiment and angle within the hopper between the shutter and the conveyor can be adjusted from about 90° to about 100°. For some crops it may be desirable to provide a greater range of adjustment e.g. from 85° to 110°.

At its lower end, shutter 104 is supported in a manner similar to that of its upper end, but in this case at both side edges, by bolts 192, 194 extending through slots 196, 198 in mounting plates 180, 182, and by associated nuts. The bolts each extend through one of a series of spaced apertures (not shown) in the side walls 108, 110 of hopper 30 to provide the same degree of angular adjustment of the shutter as the apertures 186, 188, and 190.

As shown in FIG. 3, the roller chains 96 of conveyor 62 have a series of plates 200 bolted to their inner edges and to which are welded transverse crop carrying bars 202. Each bar 202 has a series of outwardly projecting rigid fingers or pegs 202 welded thereto which, in use, extend upwardly into the peanut crop in hopper 30.

The heap lifting apparatus 32 will now be described with reference to FIGS. 4 to 7.

Apparatus 32 comprises a crop lifting arm 206 and a crop supporting member in the form of a fork 208. The crop lifting arm is connected by a pivot pin 210 to a fixed support structure 212 mounted on body portion 12 of the combine. A double acting hydraulic lift ram 214 mounted within support structure 212 is connected by a pivot 216 to arm 206 so that it can pivot the arm about pin 210 so as to raise and lower fork 208. A parallelogram linkage 218 of which crop lifting arm 206 forms the lower link maintains fork 208 substantially horizontal as it is raised. A double acting hydraulic dump ram 220 (not shown in FIG. 6) is provided to tip the fork about a pivot 222 after raising of arm 206, to tip crop into hopper 30.

Support structure 212 comprises a heavy gauge steel channel section housing 223 mounted on a pair of laterally projecting tubular support beams 224, 226 fastened to the chassis 228 (see FIG. 2) of the combine. Lift ram 214 is located within housing 223 and is pivotally connected at its rear end by a bracket 230 to beam 226. A hydraulic reservoir 232 having a filler cap 234 is also located within housing 223. A hydraulic pump 236 driven by twin vee belts (not shown) engaging a pulley 238 is mounted on housing 223 by means of a bracket 240. The pump supplies hydraulic fluid from reservoir 232 to the rams 214 and 220 via hydraulic lines 242 (see FIG. 1) under the control of a spool valve (not shown) placed near the driver of the tractor hauling the combine.

Linkage 218 comprises at the rear an upstanding bifurcated mast 244 rigid with housing 223, and at the front an L-shaped frame member 246 having a vertical box-section arm 248 and a horizontal channel section arm 250. The upper and lower links of the linkage are constituted by a rod 252 extending between pivot joints 254, 256 on mast 244 and arm 248 respectively, and by crop lifting arm 206 which is pivotally connected at its forward end to arm 248 by a pin 258.

It will be noted that the positions of pivots 210, 258, 256 and 244 do not correspond exactly wih the corners of a parallelogram. This is because a small change in attitude of the fork is desirable as it is raised and lowered, in order to achieve the best possible attitudes for heap lifting purposes and for dumping heaps into hopper 30. The term "parallelogram" as used in the claims of this specification is to be construed accordingly. It will also be noted that rod 252 is made length-adjustable by means of a threaded portion 260 and associated nuts 262, whereby the geometry of the linkage can be adjusted somewhat. An adjustable stop 261 is provided on housing 223 for engagement with an abutment 263 on lifting arm 206 to set the lowered position of said arm.

Fork 208 comprises a box-section beam 264 carrying six forwardly projecting prongs 266. The inner end of beam 264 has welded thereto a forwardly projecting sleeve 268 and a crank lever 270. The sleeve receives a spigot 272 fast with arm 248, to form pivot 222. Lever 270 is pivotally connected to the bifurcated end of the piston 274 of ram 220. The upper end of ram 220 is pivotally connected to a bracket 276 projecting from arm 248.

A latch 278 is provided to prevent extension of dump ram 220 until lifting arm 206 has reached a predetermined attitude as it is raised. The latch comprises a first or fixed latch member 280 secured by bolts 282 to the upper side of beam 264 and a second or releasable latch member 284 secured by bolts 286 to a plate 288 welded to a channel-section latching beam 290. The latch members have complementary chamfered latching edges 292, 294.

Latching beam 290 extends from latch number 284 through arm 250 to an adjustable abutment in the form of a bolt 296 mounted on bracket 298 welded to the forward end of lifting arm 206. The end of beam 290 adjacent bolt 296 constitutes an abutment for engagement with the bolt.

Latching beam 290 is mounted on arm 250 by means of a pivot bolt 300 between the ends of the beam. A coiled compression spring 302 extending between a pin 304 fixed to a bracket 306 carried by arm 250, and a pin 307 on beam 290 biases the beam clockwise as seen in plan view.

Figures 6, 7:
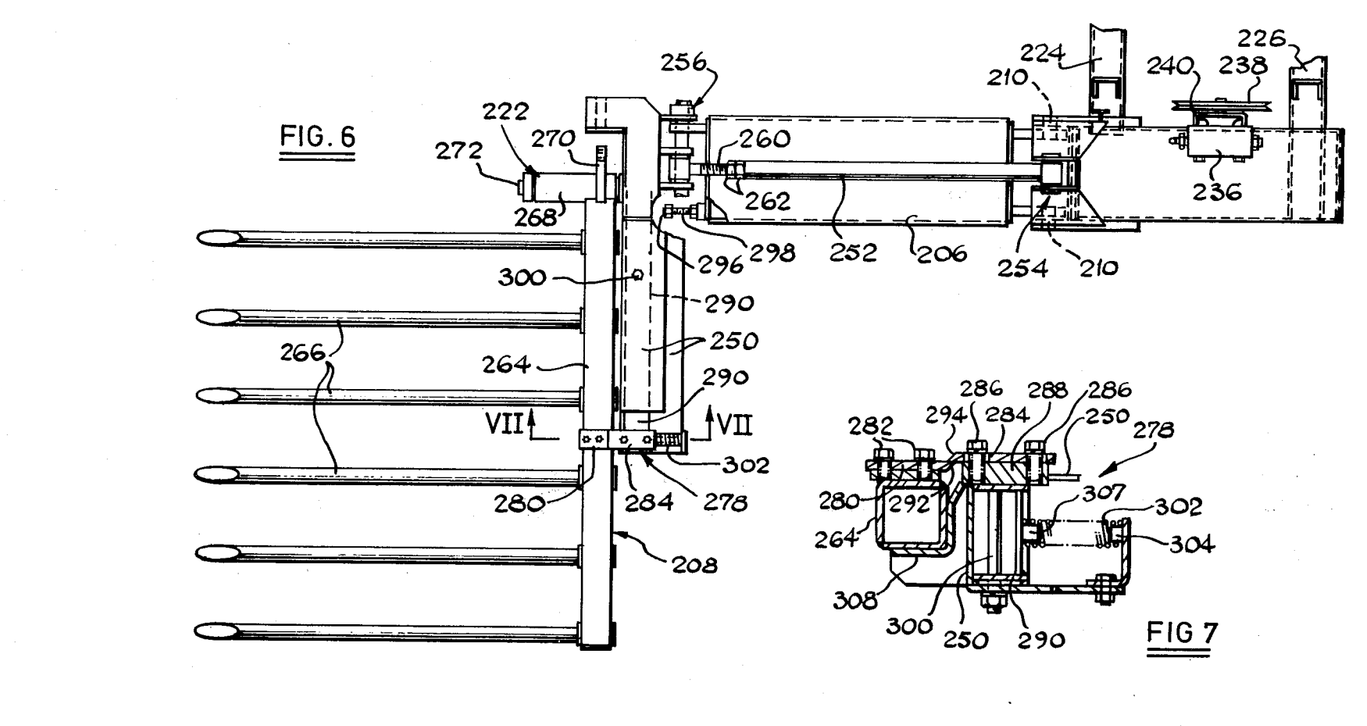
FIG. 6 shows the heap lifting apparatus in plan view.
FIG. 7 shows an enlarged section on the line VII—VII in FIG. 6.

As shown in FIG. 7 the outer end of fork 208 is supported by a forwardly projecting ledge 308 carried by arm 250.

Dump ram 220 and lifting ram 214 are connected in parallel to pump 236 through the spool valve. Sequencing means is provided to cause sequential operation of the rams. The sequencing means comprises latch 278 and a sequencing valve (not shown). The sequencing valve is located in the hydraulic line which is the supply line to the lifting ram 214 during lowering of arm 206. The valve allows free escape of fluid from the ram during lifting of arm 206 but prevents supply of fluid thereto until the fluid pressure exceeds a preset figure.

In use, the combine is drawn through the field by a tractor at a more or less constant speed of, say, between 1 and 2 miles per hour.

Figure 1:
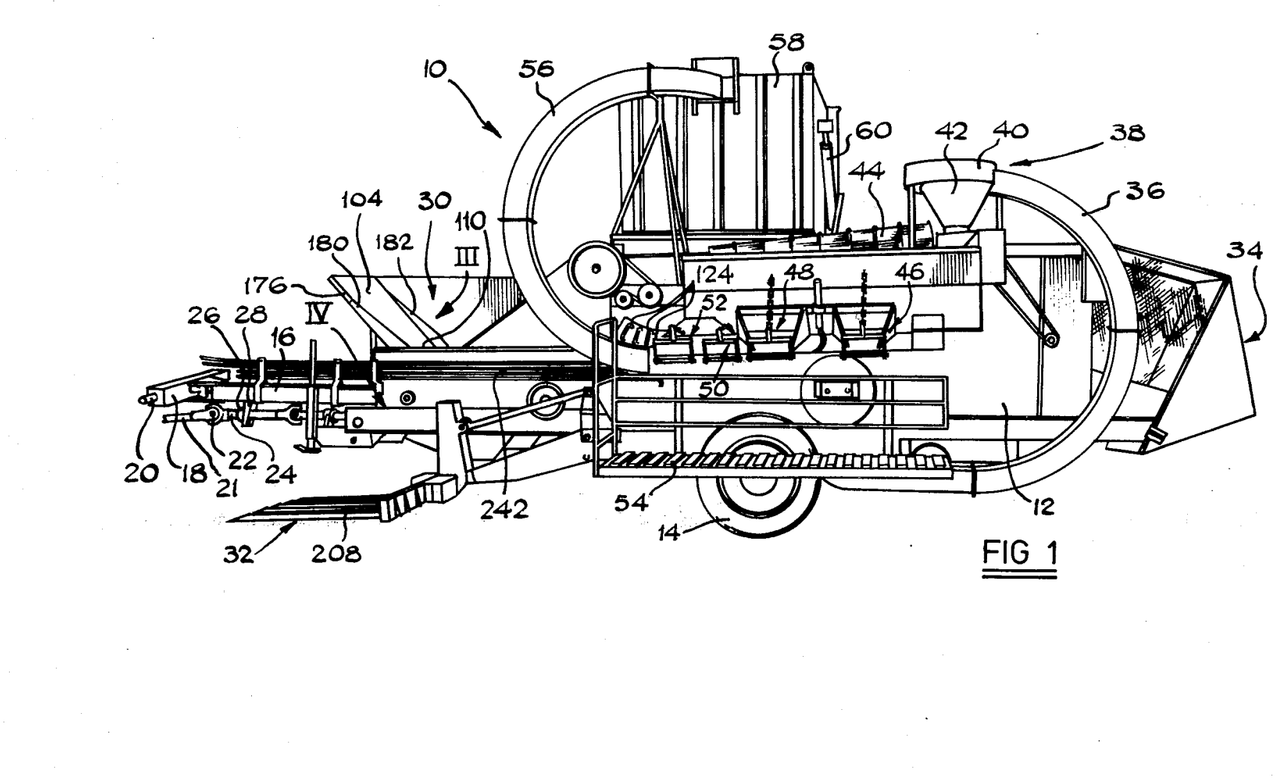
FIG. 1 shows a peanut combine in side elevation.

With fork 208 lowered, as shown in FIG. 1, the prongs 266 of the fork pass under a peanut heap. The spool valve is then operated by the tractor driver to cause pump 236 to supply fluid to rams 214 and 220. Latch 278 is in the condition shown in FIG. 7 and prevents pivoting of the fork by ram 220. Accordingly, only ram 214 extends. This raises crop lifting arm 206. Linkage 218 keeps fork 208 more or less horizontal.

When fork 208 is almost high enough for the heap to be tipped into hopper 30, abutment 296 engages the end of latching beam 290 and a little further upward movement of arm 206 is sufficient for the abutment to release latch 278 whereupon ram 220 pivots the fork about spindle 272 and the heap of peanut crop is dumped into hopper 30.

The driver then actuates the spool valve to reverse the supply of fluid to rams 214 and 220. The sequencing valve initially prevents fluid flow to ram 214 so arm 206 remains in its raised position and fork 208 is swung back to its horizontal position. Spring 302 allows latching member 284 to swing rearwards to permit the fork to be latched in its lowered position ready to pick up the next peanut heap.

The heap of crop dumped in hopper 30 lands on conveyor 62 and is supported partly by the slats 202 of the conveyor and partly by shutter 104.

The pegs 204 of the conveyor steadily eat away the lower layers of crop in the hopper and carry it towards and through feed opening 64. For a given rate of movement of pegs 204, the rate of feeding of crop depends both on the size of the gap between the lower edge 106 of the shutter and the conveyor, and on the attitude of the shutter.

As regards the attitude of the shutter 104, its effect on the rate of feeding by conveyor 62 can best be understood by considering the effect of reducing the angle within hopper 30 between the shutter and the conveyor to an angel significantly less than 90°, say to 30°. Clearly, this will result in very aggressive feeding by the conveyor. In fact there would be a definite combined wedging action by the shutter and the conveyor whereby the whole body of the crop would tend to be forced towards feed opening 64. This effect decreases as the angle between the shutter and and conveyor is increased, and more of the weight of the crop is supported by the shutter. By providing a suitable range of angular adjustment for the shutter a desirable rate of crop feeding can be achieved with any condition of crop.

After passing through feed opening 64, crop passes over feed plate 114 where soil drop out occurs, the crop passes between picking drum 68 and concave 70 where the intermeshing moving and fixed picking fingers 120 and 122 pick the peanut pods from the vines. More soil is separated at this stage.

A proportion of peanuts passes through concaves 76 and 78 and falls onto walker board 128 as the crop is moved over the concaves by the fingers of drums 72 and 74. The remaining crop is removed from drum 74 by stripper 80 and passes over screen 127 and is agitated by hay kickers 84 so that the peanuts in the crop pass through the screen onto walker board 130.

The reciprocation of walker boards 128, 130 conveys the peanuts on them towards gap 138 through which the peanuts either fall directly onto screen 156 or are deflected onto the screen by the sloping edge 170 of dividing board 158. Light crop material such as foliage and sticks is separated from the cascade of peanuts falling through gap 138 by the air current from blower 88 which carries said material over divider board 158 and out of the rear of the combine. The dividing board is position-adjusted to ensure no peanuts are lost in this air stream.

Reciprocation of screen 156 carries the crop over it and some peanuts pass through it, fall onto pan 160 and are conveyed rearwards by the reciprocation thereof and fall off the rear end of the pan onto sloping screen 162. The remaining peanuts fall off the rear end of screen 156 onto sloping screen 162. Blower 94 passes air through both streams of nuts as they fall toward screen 162 and separates further light crop material. Sand and soil passes through screen 162 and falls to the ground. Peanuts pass over screen 162 into trough 90 and are conveyed laterally by auger 92.

The subsequent handling of the peanuts has already been adequately described.

The principal advantages of the embodiment of the invention described above are as follows:

1. full mechanization of the harvesting of dried peanut heaps;
2. simple control of heap lifting apparatus 32 by means of a single control lever;
3. easy adjustment of rate of feed of crop to the picking drum of means of shutter 104 so as to achieve efficient picking under all crop conditions;
4. easy conversion to harvesting of windrowed peanut crop by installation of a pick-up reel assembly 118 to feed crop to conveyor 62.

I claim:
1. A peanut combine including a frame; peanut picking, separating and cleaning means mounted on the frame; a hopper for receiving peanuts and peanut vines mounted on the frame adjacent to the peanut picking means; and a chain and slat conveyor for conveying peanuts and peanut vines from the hopper to the peanut picking means characterized by said hopper includ- ing a lower exit opening positioned below and forward of the peanut picking means and said chain and slat conveyor including an upper run which forms a portion of the hopper and conveys peanuts and peanut vines down and through the lower exit opening and a lower run and an associated crop support plate for conveying peanuts and peanut vines from the lower exit opening to the peanut picking means.

2. The peanut combine of claim 1 wherein the hopper includes a shutter adjustably mounted in the hopper adjacent to the lower exit opening to adjust the size of the opening.

3. The peanut combine of claim 2 wherein the shutter forms at least a portion of one wall of the hopper and includes adjustment means to adjust the angle between the chain and slat conveyor and the shutter.

* * * * *